Aug. 2, 1938.  L. TARWATER  2,125,323
NUT LOCK CONSTRUCTION
Filed Nov. 23, 1936
Fig. 1.
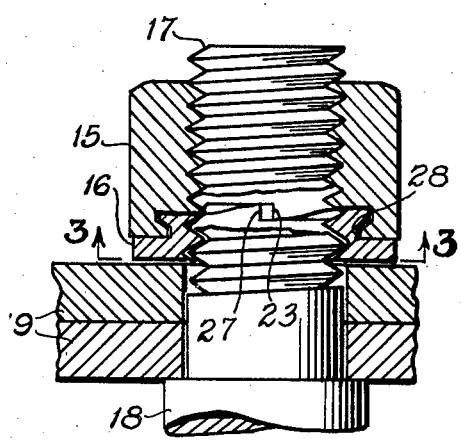
Fig. 2.
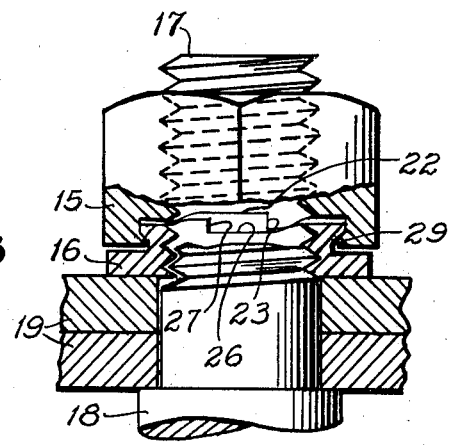
Fig. 3.
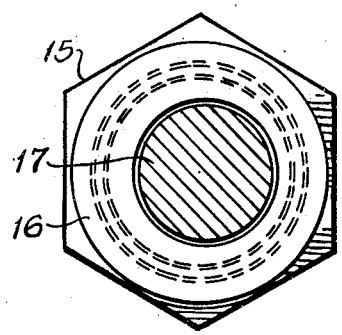
Fig. 4.
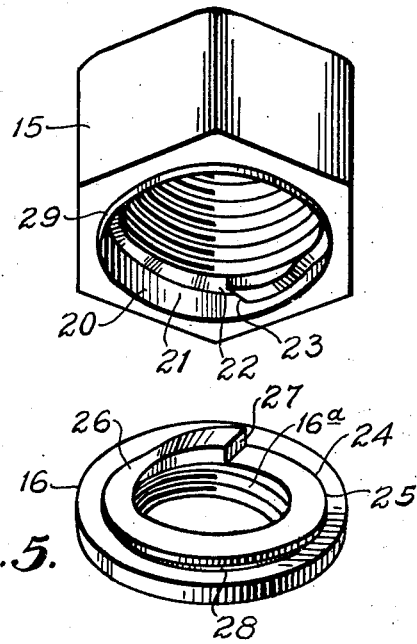
Fig. 5.
INVENTOR.
Lawson Tarwater
BY
Edwin D. Jones.
ATTORNEY.

Patented Aug. 2, 1938

2,125,323

UNITED STATES PATENT OFFICE 2,125,323

NUT LOCK CONSTRUCTION

Lawson Tarwater, Los Angeles, Calif., assignor, by direct and mesne assignments, to The Tarwater Corporation, Los Angeles, Calif.

Application November 23, 1936, Serial No. 112,212

4 Claims. (Cl. 151—19)

My invention relates to nut lock constructions and is particularly useful when employed as a nut lock for performing the function of the nut lock embodied in my Patent No. 1,667,751 issued May 1st, 1928, wherein superposed nuts coact when tightened on a bolt to exert opposite axial pressures against the bolt threads to secure the nuts against turning.

It is a purpose of my present invention to provide a nut lock construction embodying simple and positive means for locking a nut on a bolt so that neither the bolt nor the nut can be loosened by vibration or jar even under the most adverse conditions such as when used on engines and in airplanes and automobile construction and the like, and yet, when required, the nut can be readily removed without stripping the threads of the bolt or nut.

It is also a purpose of my invention to provide a nut lock construction which embodies only a single nut and a washer which, although preferably permanently connected one to the other to form a unitary structure for facilitating handling of the nut lock, allows the use of a conventional wrench in the application or removal thereof to or from a bolt and in such manner as to greatly facilitate both application and removal of the nut lock and particularly the former, without the necessity of employing a special form of wrench.

I will describe only one form of nut lock construction embodying my invention and will then point out the novel features thereof in claims.

The invention consists in the novel parts and combination of parts to be described hereinafter, all of which contribute to produce an efficient nut lock construction.

A preferred embodiment of the invention is described in the following specification, while the broad scope of the invention is pointed out in the appended claims.

In the accompanying drawing:

Fig. 1 is a view showing in central vertical section one form of nut lock embodying my invention in applied but released position on a bolt with an intermediate portion of the bolt broken away to reveal certain cams of the nut lock.

Fig. 2 is a view similar to Fig. 1 showing the nut lock in locked position on the bolt.

Fig. 3 is a transverse sectional view taken on the line 3—3 of Fig. 1.

Fig. 4 is a view showing the nut of the nut lock in perspective.

Fig. 5 is a view showing the washer of the nut lock in perspective.

Before proceeding to a more detailed description of the invention, it should be stated that I am aware that other lock constructions have been employed in which two internally threaded members are mounted on a bolt and formed with engaging cam faces at their peripheries and constructed also so that one of these members presents a circular recess eccentric to the axis of the bolt, the other member being provided with a circular eccentric collar that fits into the eccentric recess when the cam faces of the two members are in their position of rest, that is to say, in the position enabling the threaded members to be screwed onto the bolt. I am also aware that such a construction as that outlined above has been employed, in which the internally threaded members have been provided with shoulders which engage each other when the collar is fitting into the recess in the position which the two members have when being screwed onto the bolt; but in the construction in which these abutting shoulders have been employed, a spring is also employed which exerted its force in a direction to rotate the locking members relatively to each other. The use of a spring in this way makes it necessary to hold the nut members forcibly in position with the shoulders against each other when they are being applied to the bolt. In other words, in both of the constructions described above, the nut lock means virtually consists of a hexagon nut in two parts, meeting together on faces inclined to a plane at right angles to the axis of the bolt.

Forming the hexagonal lock nut member in two parts in this way by a plane cutting across the nut at about mid-height as has been the custom heretofore, is objectionable for the reason that it reduces the shearing strength of the nut at the threads to about half the shearing stress the nut should have to make the shearing strength at the threads of the nut equal to the tensile strength of the cross-section of the bolt. In other words, the construction as outlined above wastes material, while at the same time providing a nut of reduced shearing strength at its threaded bore. For it is the practice in all cases to give the nut a depth equal to the diameter of the bolt on which it is used, in order to insure that the shearing strength of the nut at the threads will be equal to the tensile strength of the cross-section of the bolt.

In accordance with my invention, I provide a nut member and a cooperating locking member which have meeting faces, one of which is formed with a recess and the other of which is formed with a collar to project into this recess; and the bottom of this recess and the opposed face of the collar are formed with cam faces, said cam faces being preferably of helical form so that an abrupt stop means or shoulder is formed in the bottom of the recess, and a similar abrupt shoulder is formed on the adjacent face of the collar. In addition to this, I make the recess of cam, or circular, form and give the collar a similar form to enable it to fit into the recess. At the same time, the recess and collar are both eccentric with respect to the axis of the bolt. Furthermore, I form the locking member or washer of circular form so that it is of smaller diameter than the diameter of the nut member across the "flats" of the nut. By reason of this construction a wrench can be applied to the nut member to rotate the nut relatively to the lock member without any danger of rotating the two simultaneously, which danger is constantly present in constructions such as referred to above, which involve the cutting of a nut by a transverse plane inclined to the horizontal so as to form the nut of two distinct nut members. Furthermore, in accordance with my invention I provide the peripheral face of the collar with a groove, and I form the nut member with a projecting fin. When the nut member and the washer are placed together with the abrupt shoulders in alignment with each other, the collar will pass into the recess. In this position the nut member and the washer member can be pressed together to bend the fin laterally into the peripheral groove of the collar, thereby securing the parts together, and at the same time, permitting a slight axial movement of the parts relative to each other, sufficient to enable them to cooperate to attain a lock nut effect. In this way, I produce a lock nut construction which affords necessary depth for the nut to give it sufficient strength, and at the same time, by reason of the engagement of the abrupt shoulders with each other, means is afforded for enabling a workman without the use of any marks on the exterior of the device, to hold the parts in proper position for applying the nut to the bolt. And, after the washer seats against the plate or face through which the bolt projects, its motion will be arrested and the continued rotation of the nut member relative to the washer or lock member, will lock the two parts together so that they will not become loose by vibration. In doing this, it will be evident that the cams at the bottom of the recess develop a stress in the nut in the general direction in which the axis of the bolt extends, while at the same time, the relative rotation of the nut with respect to the washer or locking member, will force the washer member laterally against the side of the nut, thereby developing a stress in a radial direction within the nut.

Referring specifically to the drawings, my invention in its present embodiment comprises an internally threaded nut member, which may be in the form of a lock nut 15 and includes a lock member, which may be in the form of a lock washer 16 adapted to be superimposed on an externally threaded member, for example, the threaded shank 17 of a bolt 18 extended through plates 19 for holding the latter together. At that side of the lock nut confronting the lock washer which, in the present instance, is the lower side, the lock nut is formed with a circular pocket or recess 20 eccentric to the threaded bore of the nut to provide an annular cam 21 on its inner side wall. The upper wall of the pocket 20 is formed with an inclined or helical cam 22 which ends abruptly at its highest point in a transverse shoulder 23.

The lock washer 16 preferably has a circular outer periphery and its diameter is less than the small outside diameter of the nut 15 measured across the flats of the nut for a purpose to be described hereinafter. On its inner face abutting or that face confronting the lock nut, the washer is formed with a collar 24 eccentric to the bore of the washer to form on its outer periphery a cam 25; this collar is adapted to fit within the recess 20 of the nut when the nut and washer are assembled. On its confronting face, that is, the face abutting the bottom of the recess, the collar is shaped to provide an inclined or helical cam 26 which extends in the reverse direction to that of the nut cam 22 and terminating at a transverse shoulder 27.

As previously explained herein, the nut and washer are adapted to be secured permanently one to the other to provide a unitary structure which facilitates handling thereof prior to, as well as during application of, the nut lock to a bolt. This is accomplished by forming in the washer at the base of the collar 24 an annular groove 28 in which an annular tongue 29 formed on the confronting face of the nut 15 is adapted to fit in a manner to permit rotation of the nut and washer relatively.

In Figs. 4 and 5 I have shown the nut and washer before they are assembled, it being understood that to permanently secure one to the other, the nut should be placed concentrically upon the washer with the shoulders 23 and 27 abutting each other; then by striking the nut it is jammed downwardly upon the washer until the tongue 29 is bent laterally into the groove 28.

As shown in Fig. 4, the bore of the nut 15 is screwthreaded for threading upon the bolt 18 in the usual manner. The hole in the washer 16 may be likewise screwthreaded as indicated at 16ª but the threads thereof, if desired, may be on a larger diameter than those of the nut, to loosely engage the threads of the bolt. The washer may be made without threads without deviating from the spirit of my invention, but the threads are desirable in order to effect a more secure locking of the nut lock upon the bolt, as will be later described.

In practice, to apply the nut lock to the bolt, the washer is first rotated upon the nut until the shoulders 23 and 27 abut each other, when the high point of the nut cam 22 is opposite the low point of the washer cam 26 to prevent any camming action between the two. Also, in this position of adjustment of the washer, the opening through the washer is coaxial with the hole in the nut.

Once the washer is adjusted as described (see Fig. 1), the nut lock is applied to the bolt by presenting the washer foremost, and then rotating the nut with the washer until the washer is jammed against the surface of the adjacent plate 19 to check rotation thereof and thereby fix the circumferential position of the cams 25 and 26. Then by continued rotation of the nut toward a half-turn position relative to the washer, the helical or inclined face of the nut cam 22 will ride up on the inclined face of the washer cam 26. This develops a stress between the nut and washer in a general axial direction in the nut. And this same rotation sets the cams 21 and 25 so that they set up a radial stress between the nut and washer on the bolt, jamming one side of the washer against the side of the bolt. In this way these radial and axial stresses cause such secure interlocking of the nut lock threads with the bolt threads as to positively prevent loosening of the nut under the most severe and prolonged vibrations to which they may be subjected.

By making the washer 16 of less outside diameter than the nut, and the threads of the washer such as to loosely fit the threads of the bolt, a conventional wrench can be applied to the nut 15 and operated in the usual manner to quickly screw the nut lock home on the bolt without disturbing the position to which the washer was adjusted before applying the nut lock to the bolt.

In this nut lock construction, it is practically necessary to have the cam faces adjacent the root of the shoulders 23 and 27 with a dwell portion where they are devoid of pitch for a short distance from the shoulder, as illustrated in Fig. 2. This produces a dwell in these cams when starting to move and thus enables the nut to be rotated through a considerable angle before these cam faces start to "lift" the nut to develop their stress in the nut. This insures that the eccentricity or cam action of the collar 24 will not be inhibited, and will come into operation so as to jam the collar with its lateral stress against the side of the bolt at the same time that the lifting cam stress is developing in the nut. In this connection it should be understood that if the lifting cam stress is developed too early in the rotation of the nut, it would prevent the development of the jamming due to the eccentric collar. If that happened the nut lock effect would not be obtained sufficiently to insure that the nut will not loosen up under continuous vibration.

I claim:

1. In a nut lock construction to clamp against a surface, the combination of a bolt, a nut having a thread engaging the threads of the bolt, and having a bottom face in a plane substantially perpendicular to the axis of the bolt, a lock washer having a threaded opening to receive the bolt, and having a face adjacent said bottom face in a plane substantially perpendicular to the axis of the bolt, said nut having a recess on its inner face and said lock washer having a cam member received in the said recess, the bottom of said recess and the abutting face of said collar having substantially helical cam faces respectively, and having abrupt engaging shoulders, the said cam member and said recess being eccentric to the opening of the nut, said engaging shoulders cooperating when in abutment with each other to hold the opening in the lock washer concentric with the opening in the nut, said washer operating to advance freely on the thread of the bolt when the nut is rotated, said parts cooperating when the washer engages the said surface to arrest rotation of the washer and effect the advance of the helical cam of the nut on the helical cam of the lock washer, and thereby develop a locking stress in a direction extending substantially longitudinally to the axis of the nut; and said eccentric cam and the adjacent wall of said recess cooperating to jam the lock washer laterally against the side of the bolt and thereby develop simultaneously a second locking stress in a plane substantially at right angles to the axis of the bolt.

2. In a nut lock construction, the combination of an externally threaded member, a threaded nut member and a lock-member mounted on the same, said nut member and said lock member having external abutting end faces located in a plane substantially perpendicular to the axis of said externally threaded member, one of said end faces having a cam recess and the other face having a cam collar fitting into the cam recess, the bottom of said recess having a helical cam face and a shoulder, and the end of said collar having a helical cam face and a shoulder, the side of said collar and the side of said recess constituting cooperating cam faces, said shoulders operating when in alignment with each other, to permit the collar to pass into the recess, said helical cam faces cooperating when the nut member is rotated relative to the lock member, to develop a stress in the nut member extending in the same general direction as the longitudinal axis of the nut member, and said cam face on the side of the collar operating to jam against the side face of the recess to develop a stress in the nut member in a plane transverse to the axis of the nut member.

3. In a nut lock construction to clamp against a surface, the combination of a bolt, a nut having a thread engaging the threads of the bolt, a lock washer having a threaded opening to receive the bolt, said nut having a circular recess on its inner face and said lock washer having a circular collar received in the said recess, the bottom of said recess and the abutting face of said collar having helical lifting cam faces respectively, and having abrupt engaging shoulders, the said collar and said recess being eccentric to the opening in the nut, said engaging shoulders co-operating when in abutment to hold the opening in the lock washer concentric with the opening in the nut, said parts cooperating when the nut is rotated, to advance the washer on the bolt and seat the same on said surface, thereby arresting the rotation of the washer, and causing the advance of the helical cam of the nut on the helical cam of the lock washer and thereby develop a locking stress in a direction extending substantially longitudinally with the axis of the nut; and said eccentric collar and recess cooperating to jam the lock washer laterally against the side of the bolt and thereby develop simultaneously a second locking stress in a plane substantially at right angles to the axis of the bolt, said lock washer being of substantially circular form.

4. In a nut lock construction to clamp against the surface, the combination of a bolt, a nut having a thread engaging the threads of the bolt, a lock washer having a threaded opening to receive the bolt, said nut having a circular recess on its inner face and said lock washer having a circular collar received in the said recess, the bottom of said recess and the abutting face of said collar having helical lifting cam faces, respectively, and having abrupt engaging shoulders, the said collar and said recess being eccentric to the opening in the nut, said engaging shoulders co-operating when in abutment to hold the opening in the lock washer concentric with the opening in the nut, said parts cooperating when the nut is rotated, to advance the washer on the bolt and seat the same on said surface, thereby arresting the rotation of the washer, and causing the advance of the helical cam of the nut on the helical cam of the lock washer and thereby develop a locking stress in a direction extending substantially longitudinally with the axis of the nut; and said eccentric collar and recess cooperating to jam the lock washer laterally against the side of the bolt and thereby develop simultaneously a second locking stress in a plane substantially at right angles to the axis of the bolt, said helical cam faces having dwells adjacent the abrupt shoulder of the nut when said shoulders are in contact enabling the nut to be rotated through an angle before the eccentric recess jams the washer against the side of the bolt.

LAWSON TARWATER.